(12) United States Patent
Kim et al.

(10) Patent No.: US 12,244,021 B2
(45) Date of Patent: Mar. 4, 2025

(54) FUEL CELL CATALYST, MANUFACTURING METHOD THEREFOR, AND MEMBRANE-ELECTRODE ASSEMBLY INCLUDING SAME

(71) Applicants: KOLON INDUSTRIES, INC., Seoul (KR); KOREA ADVANCED INSTITUTE OF SCIENCE AND TECHNOLOGY, Daejeon (KR)

(72) Inventors: Jun Young Kim, Seoul (KR); Nak-Won Kong, Seoul (KR); Kah-Young Song, Seoul (KR); Hee-Tak Kim, Daejeon (KR); Dong Wook Lee, Daejeon (KR)

(73) Assignees: KOLON INDUSTRIES, INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 560 days.

(21) Appl. No.: 17/614,372

(22) PCT Filed: Jun. 26, 2020

(86) PCT No.: PCT/KR2020/008323
§ 371 (c)(1),
(2) Date: Nov. 26, 2021

(87) PCT Pub. No.: WO2020/263004
PCT Pub. Date: Dec. 30, 2020

(65) Prior Publication Data
US 2022/0231303 A1 Jul. 21, 2022

(30) Foreign Application Priority Data
Jun. 28, 2019 (KR) .................. 10-2019-0078272

(51) Int. Cl.
*H01M 4/86* (2006.01)
*H01M 4/92* (2006.01)
*H01M 8/1004* (2016.01)

(52) U.S. Cl.
CPC ....... *H01M 4/8657* (2013.01); *H01M 4/8663* (2013.01); *H01M 4/926* (2013.01); *H01M 8/1004* (2013.01)

(58) Field of Classification Search
CPC .. H01M 4/8657; H01M 4/8663; H01M 4/926; H01M 8/1004
See application file for complete search history.

(56) References Cited

U.S. PATENT DOCUMENTS

2005/0287419 A1* 12/2005 Kim .................... H01M 8/1025
429/493
2010/0209814 A1 8/2010 Suzuki
(Continued)

FOREIGN PATENT DOCUMENTS

CN 1938885 A 3/2007
CN 105810961 A 7/2016
(Continued)

OTHER PUBLICATIONS

Machine Translation of: JP 2016-091878 A, Fuji et al., May 23, 2016.*
(Continued)

*Primary Examiner* — Kenneth J Douyette
(74) *Attorney, Agent, or Firm* — Harvest IP Law, LLP

(57) ABSTRACT

Disclosed are a fuel cell catalyst of which only a portion, which has relatively low catalytic activity and in which the greatest amount of platinum elution occurs and platinum oxide is easily formed, is selectively coated with a protective layer, and thus degradation due to the long-term operation of a fuel cell can be effectively prevented while also minimiz-
(Continued)

ing a deterioration in catalytic activity; a manufacturing method therefor; and a membrane-electrode assembly including same. The fuel cell catalyst of the present invention comprises: a nanoparticle containing platinum; and a protective layer which is selectively coated on only a portion of the surface of the nanoparticle and can suppress the oxidation of the platinum through electronic interaction with the nanoparticle.

17 Claims, 2 Drawing Sheets

(56) References Cited

U.S. PATENT DOCUMENTS

| | | |
|---|---|---|
| 2010/0316930 A1 | 12/2010 | Shao |
| 2013/0004885 A1 | 1/2013 | Strmonik |

FOREIGN PATENT DOCUMENTS

| | | | |
|---|---|---|---|
| JP | 2003157857 A | 5/2003 | |
| JP | 2008140703 A | 6/2008 | |
| JP | 2016091878 A | 5/2016 | |
| JP | 2017168385 A | 9/2017 | |
| KR | 20140100612 A | 8/2014 | |
| KR | 20180076950 A | 7/2018 | |
| KR | 20190037674 A | 4/2019 | |
| TW | 201517984 A | 5/2015 | |
| WO | 2011125197 A1 | 10/2011 | |
| WO | 2012095862 A2 | 7/2012 | |
| WO | 2012095863 A2 | 7/2012 | |

OTHER PUBLICATIONS

Devina Pillay and Michelle Johannes, "A First Principles Study of the Effects of Sulfur Adsorption on the Activity of Pt, Ni and Pt3Ni" AIChE, The 2007 Annual Meeting, Salt Lake City, UT, Nov. 5, 2007. Retrieved online on Jun. 12, 2024 from: https://aiche.confex.com/aiche/2007/techprogram/P85825.HTM.*
Machine Translation of: JP 2017-168385 A, Inaba et al., Sep. 21, 2017.*
JP office action dated Nov. 17, 2022.
TW Office Action dated Dec. 2, 2021.
The search report dated Dec. 8, 2023 related to the corresponding European Patent application.
The office action dated Aug. 11, 2023 related to the corresponding Chinese Patent application.
FTIR and XPS Study of Pt Nanoparticle Functionalization and Interaction with Alumina, Langulr, 5832-5841, Apr. 30, 2008.

* cited by examiner (a)

(b)

FUEL CELL CATALYST, MANUFACTURING METHOD THEREFOR, AND MEMBRANE-ELECTRODE ASSEMBLY INCLUDING SAME

CROSS REFERENCE TO RELATED APPLICATIONS

This application is a National Stage of International Application No. PCT/KR2020/008323 filed Jun. 26, 2020, claiming priority based on Korean Patent Application No. 10-2019-0078272 filed Jul. 28, 2019 and Korean Patent Application No. 10-2019-0148939 filed Nov. 19, 2019.

TECHNICAL FIELD

The present disclosure relates to a catalyst for a fuel cell, a method for manufacturing the same, and a membrane-electrode assembly comprising the same, and more particularly to a catalyst for a fuel cell configured such that only a portion where catalytic activity is relatively low, platinum migrates in a largest amount, and platinum oxide is easily formed is selectively coated with a protective layer, whereby degradation of the catalyst due to long-term operation of the fuel cell can be effectively prevented while minimizing a decrease in catalytic activity, a method for manufacturing the same, and a membrane-electrode assembly comprising the same.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and environmentally friendly characteristics thereof.

The membrane-electrode assembly generally includes an anode (also referred to as a fuel electrode), a cathode (also referred to as an air electrode), and a polymer electrolyte membrane disposed therebetween.

When fuel such as hydrogen gas is supplied to the anode, hydrogen ions ($H^+$) and electrons ($e^-$) are generated at the anode as a result of an oxidation reaction of hydrogen. The generated hydrogen ions are transferred to the cathode via the polymer electrolyte membrane, and the generated electrons are transferred to the cathode via an external circuit. Oxygen supplied to the cathode is bonded with the hydrogen ions and the electrons, and water is generated as a result of the reduction.

The anode and the cathode include catalysts for the oxidation reaction of hydrogen and the reduction reaction of oxygen, respectively, wherein a catalyst containing a platinum nanoparticle or a platinum-based alloy nanoparticle is generally used.

As a fuel cell is operated for a long time, migration and/or oxidation of the platinum is caused due to high voltage and highly acidic environments, whereby degradation of the catalyst is accelerated. In order to increase the durability and lifespan of the fuel cell, therefore, it is very important to prevent degradation of the catalyst over long-term operation of the fuel cell.

Korean Patent Nos. 1702929 and 1828175 proposed to coat an entire surface of a metal nanoparticle with a carbon shell in order to prevent degradation of a catalyst.

The carbon shell disclosed in each of the above prior art documents covers the entire surface of the metal nanoparticle of the catalyst. As a result, the active surface area of the catalyst is reduced and delivery of materials, such as fuel, air, and created water, is disturbed, whereby output performance of a membrane-electrode assembly is lowered.

DISCLOSURE

Technical Problem

Therefore, the present disclosure relates to a catalyst for a fuel cell capable of solving problems due to limitations and shortcomings of the related technology described above, a method for manufacturing the same, and a membrane-electrode assembly comprising the same.

An aspect of the present disclosure is to provide a catalyst for a fuel cell configured such that only a portion where catalytic activity is relatively low, platinum migrates in a largest amount, and platinum oxide is easily formed is selectively coated with a protective layer, whereby degradation of the catalyst due to long-term operation of a fuel cell can be effectively prevented while minimizing a decrease in catalytic activity.

Another aspect of the present disclosure is to provide a method of manufacturing a catalyst for a fuel cell configured such that only a portion where catalytic activity is relatively low, platinum migrates in a largest amount, and platinum oxide is easily formed is selectively coated with a protective layer, whereby degradation of the catalyst due to long-term operation of a fuel cell can be effectively prevented while minimizing a decrease in catalytic activity.

A further aspect of the present disclosure is to provide a membrane-electrode assembly including a catalyst configured such that degradation of the catalyst due to long-term operation of a fuel cell can be effectively prevented while minimizing a decrease in catalytic activity, whereby it is possible to maintain performance of the fuel cell for a long time and to increase lifespan of the fuel cell.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a catalyst for a fuel cell, the catalyst including a nanoparticle containing platinum and a protective layer selectively coated only on a portion of the surface of the nanoparticle, the protective layer being configured to interact with the nanoparticle so as to inhibit oxidation of the platinum.

The portion of the surface of the nanoparticle selectively coated with the protective layer may include a low-coordinated site.

The nanoparticle may have a face centered cubic (FCC) structure, and the low-coordinated site may be a (110) crystal plane.

Only the low-coordinated site of the nanoparticle may be coated with the protective layer.

The protective layer may contain a sulfur (S) atom capable of being adsorbed to the portion of the surface of the nanoparticle.

The protective layer may be formed by crosslinking of a precursor having a thiol group (—SH), whereby the protective layer may have a crosslinked structure.

The precursor having a thiol group may be (i) a carbon precursor having a thiol group, (ii) a silicon oxide precursor having a thiol group, (iii) a metal precursor having a thiol group, (iv) a metal oxide precursor having a thiol group, or (v) a mixture of two or more thereof.

The precursor having a thiol group may be (3-mercaptopropyl)triethoxysilane (MPTES), (3-mercaptopropyl) trimethoxysilane (MPTMS), or a mixture thereof.

The nanoparticle may be a platinum nanoparticle or a platinum-based alloy nanoparticle.

The platinum-based alloy nanoparticle may be Pt—Pd, Pt—Mn, Pt—Sn, Pt—Mo, Pt—Cr, Pt—W, Pt—Ru, Pt—Ni, Pt—Ru—W, Pt—Ru—Ir, Pt—Ru—Ni, Pt—Ru—Mo, Pt—Ru—Rh—Ni, Pt—Ru—Sn—W, Pt—Ru—Ir—Ni, Pt—Ru—Ir—Y, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir.

The catalyst may further include a support by which the nanoparticle is supported.

In accordance with another aspect of the present disclosure, there is provided a method for manufacturing a catalyst for a fuel cell, the method including preparing a nanoparticle containing platinum and selectively coating only a portion of a surface of the nanoparticle with a protective layer capable of interacting with the nanoparticle so as to inhibit oxidation of the platinum.

The nanoparticles may be supported by a support.

The coating may include preparing a protective layer-forming liquid containing a precursor having a thiol group, dispersing the nanoparticles in the protective layer-forming liquid such that the precursor is selectively adsorbed to only a portion of the surface of each of the nanoparticles, separating the nanoparticles having the precursor selectively adsorbed thereto from the protective layer-forming liquid, drying the separated nanoparticles, and thermally treating the dried nanoparticles to crosslink the precursor.

The protective layer-forming liquid may include a solvent selected from the group consisting of ethanol, distilled water, isopropyl alcohol, normal propyl alcohol, butanol, and a mixture of two or more thereof and the precursor dissolved in the solvent.

The molar concentration of the precursor in the protective layer-forming liquid may be 0.25 to 2 mM.

The weight ratio of the precursor contained in the protective layer-forming liquid to the nanoparticles dispersed in the protective layer-forming liquid may be 2.5 to 20%.

The separating the nanoparticles may be performed by means of centrifugation.

In accordance with a further aspect of the present disclosure, there is provided a membrane-electrode assembly including an anode, a cathode, and a polymer electrolyte membrane between the anode and the cathode, wherein at least one of the anode and the cathode includes the aforementioned catalyst.

The general description of the present disclosure given above is provided merely to illustrate or describe the present disclosure, and does not limit the scope of rights of the present disclosure.

Advantageous Effects

According to the present disclosure, only a portion where catalytic activity is relatively low, platinum migrates in a largest amount, and platinum oxide is easily formed (i.e. a low-coordinated site) is selectively coated with a protective layer, whereby degradation of a catalyst due to long-term operation of a fuel cell can be effectively prevented while minimizing a decrease in catalytic activity. Consequently, it is possible to maintain performance of the fuel cell for a long time and to increase lifespan of the fuel cell.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

Figure 1:
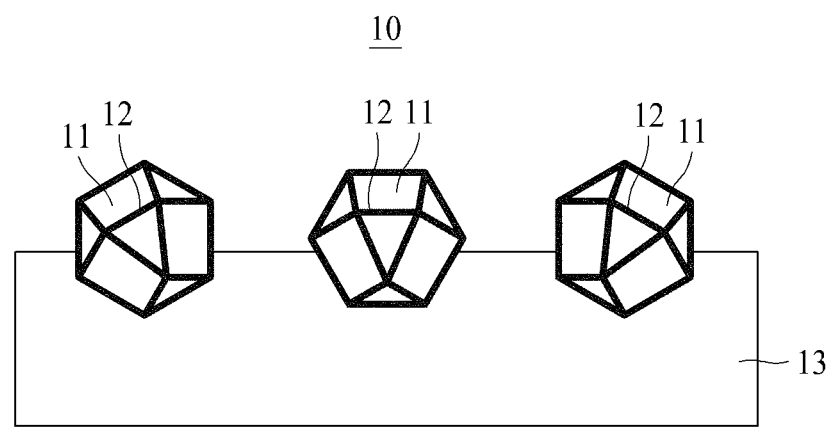
FIG. 1 is a schematic view showing a catalyst for a fuel cell according to an embodiment of the present disclosure.

As illustrated in FIG. 1, a catalyst 10 for a fuel cell according to the present disclosure includes a nanoparticle 11 containing platinum and a protective layer 12 selectively coated only on a portion of the surface of the nanoparticle 11.

The term "nanoparticle" as used herein means a particle having a size of 1 nm or larger but less than 1 μm.

The protective layer 12 according to the present disclosure not only may physically inhibit migration of platinum from the nanoparticle 11 and oxidation of platinum but also may chemically inhibit oxidation of platinum through electronic interaction with the nanoparticle 11.

A portion of the surface of the nanoparticle 11 selectively coated with the protective layer 12 is a low-coordinated site which is an area where catalytic activity is relatively low, platinum migrates in a largest amount, and platinum oxide is easily formed.

That is, only a low-coordinated site, which is a portion where catalytic activity is relatively low and platinum degradation is likely to occur most excessively, is selectively coated with the protective layer 12 according to the present disclosure, whereby it is possible to minimize a decrease in active surface area. The active surface area of the catalyst 10 according to the present disclosure is 50 to 90% of the active surface area of a conventional catalyst having no protective layer.

Consequently, according to the present disclosure, it is possible to minimize a decrease in catalytic activity which otherwise might be caused due to a decrease in active surface area and, at the same time, to effectively prevent degradation of the catalyst 10. According to the present disclosure, therefore, it is possible to maintain excellent performance of a fuel cell for a long time and to increase the lifespan of the fuel cell.

In general, the nanoparticle 11 according to the present disclosure has a face centered cubic (FCC) structure, and the low-coordinated site is a (110) crystal plane. According to an embodiment of the present disclosure, therefore, a portion of the surface of the nanoparticle 11 selectively coated with the protective layer 12 may include a (110) crystal plane. Optionally, only the (110) crystal plane of the nanoparticle 11 may be coated with the protective layer 12.

The nanoparticle 11 may have a crystal lattice structure other than the FCC structure, e.g., a body centered cubic (BCC) structure. In this case, the low-coordinated site to be coated with the protective layer 12 may be (110) crystal plane, (111) crystal plane, (100) crystal plane, and/or (211) crystal plane.

The protective layer 12 may contain a sulfur (S) atom capable of being adsorbed to the low-coordinated site of the nanoparticle 11. More specifically, the protective layer 12 may have a thiol group (—SH). A sulfur (S) atom of the thiol group (—SH), which exhibits high electronegativity, is strongly adsorbed to the low-coordinated site of the nanoparticle 11 made of platinum or a platinum-based alloy (e.g. a (110) crystal plane of an FCC lattice structure).

According to an embodiment of the present disclosure, the protective layer 12 may be formed by crosslinking of a precursor having a thiol group, whereby the protective layer may have a crosslinked structure. A protective layer formed of a thiol compound having a linear structure, such as alkanethiol, has low stability since the main chain of the thiol compound is likely to be broken easily. That is, the protective layer 12 having the crosslinked structure according to the embodiment of the present disclosure may perform the function of preventing catalyst degradation, which is essential to a protective layer, more stably and for a longer time than the protective layer having the linear structure.

The precursor having the thiol group may be (i) a carbon precursor having a thiol group, (ii) a silicon oxide precursor having a thiol group, (iii) a metal precursor having a thiol group, (iv) a metal oxide precursor having a thiol group, or (v) a mixture of two or more thereof. For example, the precursor having the thiol group may be (3-mercaptopropyl) triethoxysilane (MPTES), (3-mercaptopropyl)trimethoxysilane (MPTMS), or a mixture thereof.

The nanoparticle 11 may be a platinum nanoparticle or a platinum-based alloy nanoparticle.

The platinum-based alloy nanoparticle may be Pt—Pd, Pt—Mn, Pt—Sn, Pt—Mo, Pt—Cr, Pt—W, Pt—Ru, Pt—Ni, Pt—Ru—W, Pt—Ru—Ir, Pt—Ru—Ni, Pt—Ru—Mo, Pt—Ru—Rh—Ni, Pt—Ru—Sn—W, Pt—Ru—Ir—Ni, Pt—Ru—Ir—Y, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir.

As illustrated in FIG. 1, the catalyst 10 for a fuel cell according to the embodiment of the present disclosure may further include a support 13 by which the nanoparticles 11 are supported. FIG. 1 illustrates that all nanoparticles 11 are disposed on the surface of the support 13. However, the present disclosure is not limited thereto. At least some of the nanoparticles 11 may permeate the support 13 and fill the pore(s) thereof.

The support 13 may be (i) a carbon-based support, (ii) a porous inorganic oxide support, such as zirconia, alumina, titania, silica, and ceria, or (iii) a zeolite support.

The carbon-based support may be selected from the group consisting of graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a combination of two or more thereof.

Hereinafter, a method of manufacturing a catalyst for a fuel cell according to the embodiments of the present disclosure will be described in detail.

The method of manufacturing the catalyst for a fuel cell according to the present disclosure includes preparing a nanoparticle 11 containing platinum and selectively coating only a portion of the surface of the nanoparticle 11 with a protective layer 12 capable of interacting with the nanoparticle 11 so as to inhibit oxidation of the platinum.

As previously described, the nanoparticle 11 may be supported by a support 13 such as a carbon-based support.

According to an embodiment of the present disclosure, the coating may include (i) preparing a protective layer-forming liquid containing a precursor having a thiol group, (ii) dispersing the nanoparticles 11 in the protective layer-forming liquid such that the precursor is selectively adsorbed to only a portion of the surface of each of the nanoparticles 11, (iii) separating the nanoparticles 11 having the precursor selectively adsorbed thereto from the protective layer-forming liquid, (iv) drying the separated nanoparticles 11, and (v) thermally treating the dried nanoparticles 11 to crosslink the precursor selectively adsorbed to a portion of the surface of each of the nanoparticles 11 and thus to form the protective layer 12.

The protective layer-forming liquid may be obtained by dissolving the precursor in a solvent selected from the group consisting of ethanol, distilled water, isopropyl alcohol, normal propyl alcohol, butanol, and a mixture of two or more thereof. Concrete examples of the precursor having a thiol group were described previously, and therefore a detailed description thereof will be omitted.

The molar concentration of the precursor in the protective layer-forming liquid may be 0.25 to 2 mM.

The weight ratio of the precursor contained in the protective layer-forming liquid to the nanoparticles 11 dispersed in the protective layer-forming liquid may be 2.5 to 20%, more preferably 5 to 10%.

If the weight ratio is less than 2.5%, it is not possible to form the protective layer 12 on the entirety of the low-coordinated sites of the nanoparticles 11, and thus it is not possible to sufficiently prevent degradation of the catalyst 10.

On the other hand, if the weight ratio is greater than 20%, the protective layer 12 is also coated on a portion of the nanoparticle 11 other than the low-coordinated sites, whereby the catalyst active surface area is significantly reduced, and thus activity of the catalyst 10 is seriously lowered. That is, when the nanoparticles 11 are dispersed in the protective layer-forming liquid, the precursor having a thiol group is first adsorbed to the low-coordinated sites of the nanoparticles 11. Once the low-coordinated sites of the nanoparticles 11 are saturated with the precursor, however, the precursor is further adsorbed to the high-coordinated sites of the nanoparticles 11. In order to achieve a desired effect of the present disclosure, therefore, it is very important to appropriately adjust the weight ratio of the precursor to the nanoparticles 11 within the above range.

Optionally, the protective layer-forming liquid having the nanoparticles 11 dispersed therein may be stirred for one or two days in order to accelerate the adsorption of the precursor.

Centrifugation may be performed to separate the nanoparticles 11 having the precursor selectively adsorbed thereto from the protective layer-forming liquid.

The nanoparticles 11 separated from the protective layer-forming liquid are dried at 40 to 80° C. for 12 to 36 hours, whereby the precursor selectively adsorbed to a portion of the surface of each nanoparticle 11 is crosslinked, and therefore the protective layer 12 according to the present disclosure is created.

The catalyst 10 for a fuel cell according to the present disclosure thus obtained may be dispersed in a dispersion medium together with an ionomer to prepare a dispersion solution, and an anode and/or a cathode of a membrane-electrode assembly may be formed using the dispersion solution.

A membrane-electrode assembly according to the present disclosure may be manufactured by (i) forming an electrode using the dispersion solution and then transferring the electrode to a polymer electrolyte membrane or (ii) directly coating the dispersion solution on a polymer electrolyte membrane to form an electrode. The membrane-electrode assembly includes an anode, a cathode, and a polymer electrolyte membrane disposed therebetween, wherein at least one of the anode and the cathode includes the catalyst 10 according to the present disclosure.

The ionomer dispersed in the dispersion medium together with the catalyst 10 for a fuel cell is provided for a hydrogen ion transfer, and may function as a binder to enhance the adhesion between the electrode and the polymer electrolyte membrane. The ionomer may be a proton conductor having at least one proton exchange group selected from the group consisting of a sulfonic acid group, a carboxyl group, a boronic acid group, a phosphate group, an imide group, a sulfonimide group, a sulfonamide group, a sulfonic acid fluoride group, and a combination thereof. Specifically, the ionomer according to an embodiment of the present disclosure may be (i) a fluorine-based proton conductor having a sulfonic acid group and/or a carboxyl group, (ii) a hydrocarbon-based proton conductor having a sulfonic acid group and/or a carboxyl group, or (iii) a mixture thereof.

Preferably, the content of the catalyst 10 in the dispersion solution is adjusted such that the weight of the catalyst 10 is 20 to 80 wt % of the total weight of the electrode. If the content of the catalyst 10 in the electrode is less than 20 wt %, catalytic activity required for the electrode may not be satisfied. On the other hand, if the content of the catalyst 10 in the electrode is greater than 80 wt %, aggregation of the catalyst 10 might be caused, which reduces the active surface area of the catalyst 10 and lowers catalytic activity thereof.

Hereinafter, the present disclosure will be described in detail with reference to concrete examples. However, the following examples are given merely to assist in understanding of the present disclosure, and do not limit the scope of rights of the present disclosure.

Examples 1 to 3

(3-mercaptopropyl)triethoxysilane (MPTES) was dissolved in ethanol to prepare a protective layer-forming liquid, and then Pt/C catalysts were dispersed in the protective layer-forming liquid. The weight ratio of MPTES in the protective layer-forming liquid to the Pt in the dispersed Pt/C catalysts and the molar concentration of MPTES in the protective layer-forming liquid are shown in Table 1 below. The protective layer-forming liquid having the Pt/C catalysts dispersed therein was mixed for 24 hours, and then centrifugation was performed three times to remove ethanol and residual MPTES. Thus obtained Pt/C catalysts having MPTES selectively adsorbed thereto were dried in a vacuum oven at 60° C. for 24 hours, whereby "Pt/C catalyst having a protective layer selectively coated thereon" was completed.

TABLE 1

| | Example 1 | Example 2 | Example 3 |
|---|---|---|---|
| Weight ratio of MPTES to Pt (%) | 2.5 | 10 | 20 |
| Molar concentration of MPTES in protective layer-forming liquid (mM) | 0.25 | 1.0 | 2.0 |

Comparative Example 1

The same catalyst as the Pt/C catalyst used in Examples was used as it is without forming a protective layer thereon.

Comparative Example 2

Polyimide which is a polymer having no selectivity with respect to a platinum crystal plane was coated on the entire exposed surface of each of Pt nanoparticles to prepare a catalyst. Specifically, polyamic acid, serving as a polyimide precursor, was introduced into NMP solvent together with the same Pt/C catalysts as used in Examples, and then they were dispersed therein. The weight ratio of polyamic acid to the catalysts was 3 wt %. The dispersed solution was mixed at room temperature for 24 hours, and then centrifugation was performed several times to remove residual polyamic acid. The catalysts thus obtained were thermally treated in a nitrogen atmosphere at 300° C. for 3 hours to imidize the polyamic acid coated on the catalyst. As a result, a catalyst having a polyimide polymer coated on the entire exposed surfaces of Pt nanoparticles dispersed on a carbon support was obtained.

Experimental Example

For the catalysts manufactured according to Examples and Comparative Examples, (i) adsorption selectivity of the protective layer and (ii) electrochemical durability were measured using the following method.

Each of the catalysts was dispersed in a mixed solution of isopropyl alcohol and water mixed in a volumetric ratio of 7:3 through ultrasonic dispersion to manufacture ink. The concentration of the catalyst in the mixed solution was 1.6 mg/ml. Subsequently, the ink was cast on a rotating disk electrode (RDE) and then dried to manufacture an electrode. A half cell test was performed with respect to the obtained electrode at 0.1 M of an Aqueous HClO4 solution electrolyte. The electrochemical active surface area of the catalyst and selective adsorption of MPTES with respect to Pt were investigated using a hydrogen desorption peak between 0.05 and 0.4 V obtained at 0.1 M of the Aqueous HClO4 solution electrolyte saturated with $N_2$ at room temperature through cyclic voltammetry (CV). Subsequently, the electrolyte was saturated with $O_2$, a current value at 0.9 V obtained through linear sweep voltammetry (LSV) was measured, and activity of the catalyst was calculated therefrom. Also, in order to evaluate electrochemical durability, voltage cycling of 0.6 to 1.0 V was performed at the electrolyte saturated with $O_2$, and a decrease in active surface area and a decrease in activity were measured after 30,000 cycles.

Figure 2:
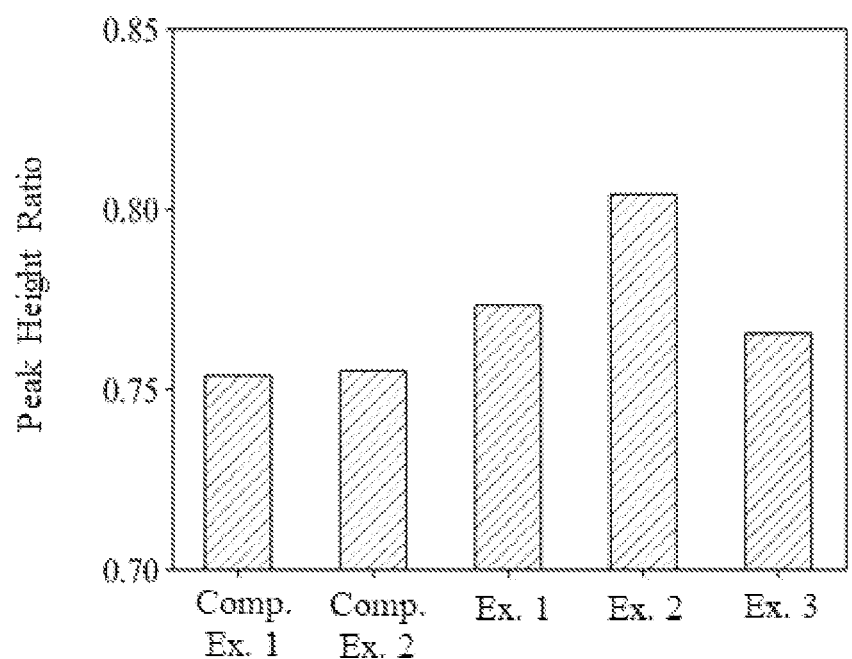
FIG. 2 is a graph showing a height ratio of a low-coordinated site peak (0.15V) to a high-coordinated site peak (0.2V) (i.e., (height of low-coordinated site peak)/(height of high-coordinated site peak)) at each hydrogen desorption peak obtained by performing cyclic voltammetry (CV) with respect to catalysts manufactured according to Examples 1 to 3 and Comparative Examples 1 and 2.

FIG. 2 is a graph showing a height ratio of a low-coordinated site peak (0.15V) to a high-coordinated site peak (0.2V) (i.e., (height of low-coordinated site peak)/(height of high-coordinated site peak)) at each hydrogen desorption peak obtained by performing cyclic voltammetry (CV) with respect to the catalysts manufactured according to Examples 1 to 3 and Comparative Examples 1 and 2.

As can be seen from FIG. 2, the greater the selectivity with respect to the low-coordinated site was, the higher the peak height ratio was. Comparative Example 1, in which no selective protective layer was formed, exhibited the lowest peak height ratio (0.754), and, similarly to Comparative Example 1, Comparative Example 2, in which the entire exposed surface of each of the nanoparticles was coated with polyimide, also exhibited a low peak height ratio of 0.756. In contrast, all the Examples, in each of which the selective protective layer was formed, exhibited higher peak height ratios than Comparative Examples.

Example 2 exhibited the highest peak height ratio, whereas Example 3, in which the precursor was used in a relatively large amount, exhibited a relatively low peak height ratio. This reveals that the precursor for forming the protective layer is adsorbed first to the low-coordinated site of Pt and, after the low-coordinated site is saturated, adsorbed to the high-coordinated site of Pt. That is, it is indicated that the protective layer according to the present disclosure is formed on the low-coordinated site of Pt on the preferential basis.

FIGS. 3(a) and 3(b) are graphs respectively showing a change in electrochemically active surface area (ECSA) retention rate and a change in catalytic activity retention rate of the catalysts manufactured according to Examples 2 and 3 and Comparative Examples 1 and 2 in every period of 10,000 cycles of voltage cycling.

It can be seen that both the electrochemically active surface area and the catalytic activity of the catalyst of Comparative Example 1, in which no selective protective layer was formed, and the catalyst of Comparative Example 2, in which the entire exposed surface of each nanoparticle was coated with polyimide, were abruptly reduced as the voltage cycling was performed.

In contrast, it can be seen that decrease rates of the electrochemically active surface area and the catalytic activity of the catalysts of Examples 2 and 3 as a result of the voltage cycling were much less than the decrease rates of Comparative Examples.

Figure 3:
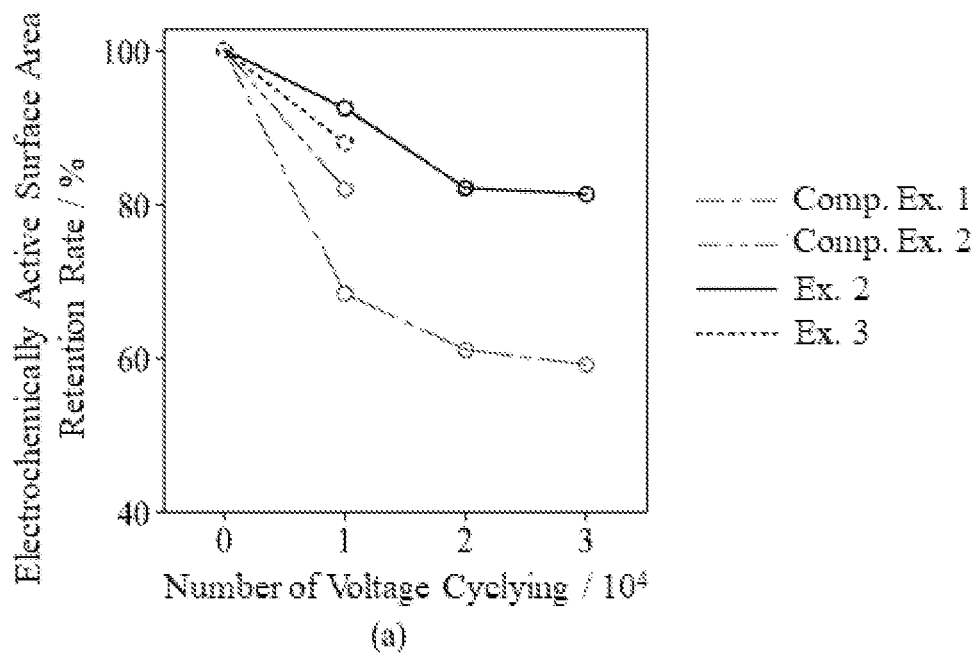
FIGS. 3(a) and 3(b) are graphs respectively showing a change in electrochemically active surface area (ECSA) retention rate and a change in catalytic activity retention rate of the catalysts manufactured according to Examples 2 and 3 and Comparative Examples 1 and 2 in every period of 10,000 cycles of voltage cycling.
Figure 3:
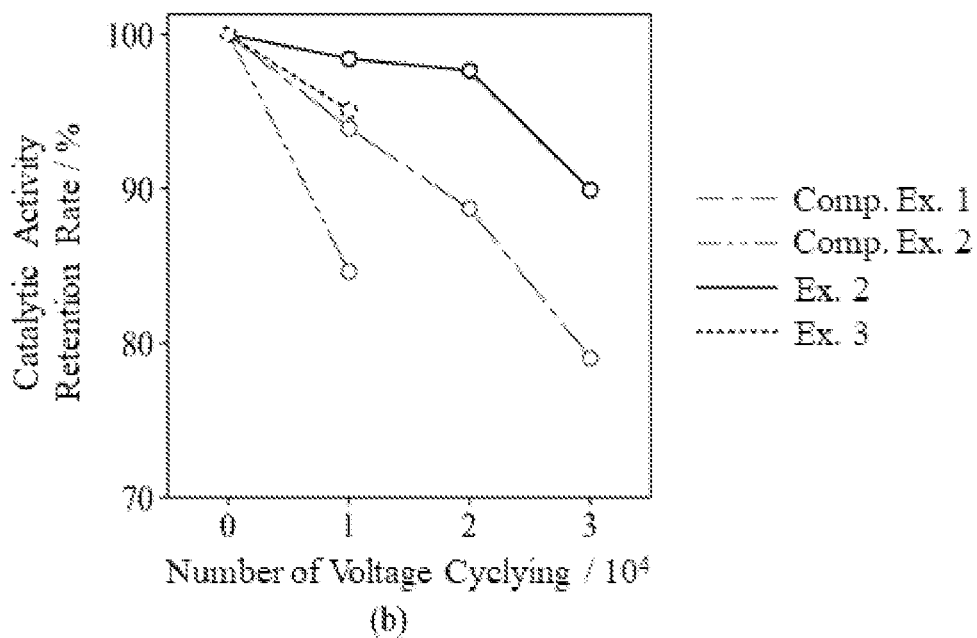

In conclusion, it can be seen from FIGS. 2 and 3 that the electrochemical durability of the catalyst having the protective layer selectively formed thereon according to the present disclosure is greatly improved while minimizing a decrease in catalytic activity which otherwise might be caused due to the presence of a protective layer.

The invention claimed is:

1. A catalyst for a fuel cell, the catalyst comprising:
a nanoparticle containing platinum; and
a protective layer selectively coated only on a portion of a surface of the nanoparticle, the protective layer being configured to interact with the nanoparticle so as to inhibit oxidation of the platinum,
wherein the portion of the surface of the nanoparticle selectively coated with the protective layer comprises a low-coordinated site, and
wherein only the low-coordinated site of the nanoparticle is coated with the protective layer.

2. The catalyst according to claim 1, wherein
the nanoparticle has a face centered cubic (FCC) structure, and
the low-coordinated site is a (110) crystal plane.

3. The catalyst according to claim 1, wherein the protective layer contains a sulfur(S) atom capable of being adsorbed to the portion of the surface of the nanoparticle.

4. The catalyst according to claim 1, wherein the protective layer is formed by crosslinking of a precursor having a thiol group (—SH), whereby the protective layer has a crosslinked structure.

5. The catalyst according to claim 4, wherein the precursor having a thiol group is (i) a carbon precursor having a thiol group, (ii) a silicon oxide precursor having a thiol group, (iii) a metal precursor having a thiol group, (iv) a metal oxide precursor having a thiol group, or (v) a mixture of two or more thereof.

6. The catalyst according to claim 4, wherein the precursor having a thiol group is (3-mercaptopropyl) triethoxysilane (MPTES), (3-mercaptopropyl) trimethoxysilane (MPTMS), or a mixture thereof.

7. The catalyst according to claim 1, wherein the nanoparticle is a platinum nanoparticle or a platinum-based alloy nanoparticle.

8. The catalyst according to claim 7, wherein the platinum-based alloy nanoparticle is Pt—Pd, Pt—Mn, Pt—Sn, Pt—Mo, Pt—Cr, Pt—W, Pt—Ru, Pt—Ni, Pt—Ru—W, Pt—Ru—Ir, Pt—Ru—Ni, Pt—Ru—Mo, Pt—Ru—Rh—Ni, Pt—Ru—Sn—W, Pt—Ru—Ir—Ni, Pt—Ru—Ir—Y, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir.

9. The catalyst according to claim 1, further comprising a support by which the nanoparticle is supported.

10. A method for manufacturing a catalyst for a fuel cell, the method comprising:
preparing a nanoparticle containing platinum; and
selectively coating only a portion of a surface of the nanoparticle with a protective layer capable of interacting with the nanoparticle so as to inhibit oxidation of the platinum,
wherein the portion of the surface of the nanoparticle selectively coated with the protective layer comprises a low-coordinated site, and
wherein only the low-coordinated site of the nanoparticle is coated with the protective layer.

11. The method according to claim 10, wherein the nanoparticle is supported by a support.

12. The method according to claim 10, wherein the coating comprises:
preparing a protective layer-forming liquid containing a precursor having a thiol group;
dispersing the nanoparticles in the protective layer-forming liquid such that the precursor is selectively adsorbed to only the low-coordinated site of each of the nanoparticles;
separating the nanoparticles having the precursor selectively adsorbed thereto from the protective layer-forming liquid;
drying the separated nanoparticles; and thermally treating the dried nanoparticles to crosslink the precursor.

13. The method according to claim 12, wherein the protective layer-forming liquid comprises:
   a solvent selected from the group consisting of ethanol, distilled water, isopropyl alcohol, normal propyl alcohol, butanol, and a mixture of two or more thereof; and
   the precursor dissolved in the solvent.

14. The method according to claim 13, wherein a molar concentration of the precursor in the protective layer-forming liquid is 0.25 to 2 mM.

15. The method according to claim 12, wherein a weight ratio of the precursor contained in the protective layer-forming liquid to the nanoparticles dispersed in the protective layer-forming liquid is 2.5 to 20%.

16. The method according to claim 12, wherein the separating the nanoparticles is performed by means of centrifugation.

17. A membrane-electrode assembly comprising:
   an anode;
   a cathode; and
   a polymer electrolyte membrane between the anode and the cathode,
   wherein at least one of the anode and the cathode comprises the catalyst according to claim 1.

* * * * *